3,265,643
CELLULAR POLYSTYRENE AND METHOD OF MANUFACTURING THE SAME
Itaru Hatano and Kazuya Senuma, Kobe, and Tadashi Kasamatsu and Minoru Nishino, Tokyo, Japan, assignors to Kanegafuchi Chemical Industry Company, Limited, Osaka, Japan, a corporation of Japan
No Drawing. Filed Sept. 9, 1963, Ser. No. 312,816
Claims priority, application Japan, Oct. 4, 1962, 37/44,195
12 Claims. (Cl. 260—2.5)

This invention relates to cellular polystyrene and methods of manufacturing the same.

Cellular polystyrene has many well known uses, and products thereof may be formed by conventional molding and extrusion processes. We have been particularly interested in the development of air-cellular polystyrene in sheet-form for such uses as substitutes for thick paper, cardboard, etc., or heat insulation or buffering materials, etc. It is, however, to be particularly noted that our invention is not to be construed as being limited to these types of products.

Regardless of the use to which cellular polystyrene is to be put, it is obvious that the manufacturer thereof will seek to produce an air-cellular polystyrene which will provide a product of superior quality. Generally, in order to provide a finished product of superior quality, such air-cellular polystyrene should have a low specific gravity of between 0.05 and 0.20, gas cells having an average diameter of less than 0.6 mm., the optimum in air cell diameter being below 0.2 mm., cells of uniform size which are distributed uniformly, avoiding any portion of unevenly or inclined thickness of the foam or insufficiently foamed portions, or pinholes, and a good dimensional stability which will not suffer contraction after having been caused to foam by heating in the molding or extrusion process. Moreover, the finished product should be of good appearance, having a relatively smooth surface. It is an object of our invention to provide a cellular polystyrene having these characteristics.

Recognizing the fact that manufacturers of cellular polystyrene products and the manufacturers of expandable polymerized polystyrene particles from which such products are produced will be in competition with each other, it is necessary to provide for the economical manufacture of expandable polymerized polystyrene particles which can be competitively priced. It is thus a further object of our invention to provide expandable polymerized polystyrene particles which will produce a product of superior quality and which may be manufactured on an industrial scale.

Other objects and advantages of our invention will become apparent during the course of the following detailed description.

In developing our invention we initially reviewed the quality of the many cellular polystyrenes which are currently on the market. We determined that the majority of them were of poor quality, inasmuch as they had a relatively high specific gravity and the gas cells thereof were of large diameter and distributed in an uneven and irregular manner. Moreover, such previously provided air-cellular polystyrenes had portions with unevenly or inclined thickness of the foam, portions insufficiently foamed, a plurality of pinholes, many of them extremely large, and they were generally of a poor quality having a coarse surface and an unsightly appearance.

We likewise reviewed the manufacturing methods now employed for the production of expandable polymerized polystyrene particles. Such review led us to the conclusion that the present manufacturing processes are generally uneconomical and result in the production of an inferior end product.

Such being the case, it becomes obvious that it has long been a problem in this field of industry to develop a manufacturing method for the production of superior quality products without the above noted disadvantages, and likewise a manufacturing method suitable for industrial production on a profitable basis.

One of the facets of our invention relates to the size of expandable polymerized polystyrene particles. We discovered that no one has previously paid any particular attention to the size thereof. Expandable polymerized polystyrene particles were previously utilized which had a mean diameter of from approximately 1.2 mm. to 2.00 mm. Through research we determined that the uniformity of the ultimate polystyrene product and the distribution of gas cells therethrough is directly related to the size of the expandable polymerized polystyrene particles used in formation of the product. We discovered that use of an expandable polymerized polystyrene particle of large diameter will result in an end product which is non-uniform and has an uneven distribution of gas cells. Such product will have an unattractive coarse surface. To the contrary, when expandable polymerized polystyrene particles are utilized which have an excessively small diameter, they are inconvenient to handle and will deteriorate under normal storage conditions. In both cases, that is when the expandable polymerized polystyrene particles are either too large or too small, the end product produced therefrom will be of an inferior quality.

We discovered that the optimum mean diameter for expandable polymerized polystyrene particles was in the range of 0.40 to 1.0 mm. It will be particularly noted that this range is below the lower limit of mean particle diameter utilized in the past. The use of expandable polymerized polystyrene particles having a mean diameter within the range of 0.40 to 1.0 mm. in association with prescribed foaming agents, which will hereinafter be discussed, resulted in the production of an end product having optimum quality. Our findings were confirmed by experimentation, as exemplified in Table 1 herebelow.

TABLE 1.—DIAMETER OF EXPANDABLE PARTICLES AND QUALITY OF THE OBJECTEIV MOLDED PRODUCT

| Experiment No | 1 | 2 |
|---|---|---|
| Material particles: | | |
| Mean particle dia. (mm.) | 1.6 | 0.9. |
| Presence or not of deformation and flaws. | Present | Present. |
| Degree of foaming (cc./10 g.) | 480 | 480. |
| Molded product: | | |
| Specific gravity | 0.070 | 0.070. |
| Dia. of gas cells: | | |
| Max. (mm.) | 0.68 | 0.44. |
| Min. (mm.) | 0.14 | 0.14. |
| Mean (mm.) | 0.42 | 0.30. |
| Deviations | Those with dia. of 0.3–0.5 mm. occupy 40% of the total. | Those with dia. around 0.3 mm. occupy 65% of the total. |
| Pinholes (ruptured parts): | | |
| Number of pinholes (pc./m.$^2$) | 5,039 | 666. |
| Max. dia. (mm.) | 2.0 | 2.0. |
| Min. dia. (mm.) | 0.5 | 0.5. |
| Distribution | Those with dia. of 1–2 mm. occupy about 50% of the total. | Those with dia. of 1–2 mm. occupy about 30% of the total. |
| Gas cells: | | |
| Condition of distribution | Uneven and irergular | Uniform and good. |
| Thickness of cell wall | Cell walls are uneven with irregular thicknesses. | Even and no irregularity in thickness. |
| Feel: | | |
| Surface | Smooth | Smooth. |
| Texture | Coarse | Fine and beautiful. |

We further discovered that there is a direct relationship between the shape of the expandable polymerized polystyrene particles and the end product formed therefrom. We noted that the expandable polymerized polystyrene particles now available had irregular, uneven peripheries, and had a plurality of protrusions and dented portions in the outer peripheries thereof. The end products obtained from use of such irregular expandable polymerized polystyrene particles were observed to contain gas cells of irregular and uneven diameters, ruptured gas cells, non-uniform distribution of gas cells, and a plurality of pinholes.

We discovered that when the expandable polymerized polystyrene particles are of proximate true roundness, an end product of optimum quality was obtained. Our findings in this respect were confirmed by experimentation, as exemplified by the data set forth in Table 2 hereof.

We further discovered that there is a close relationship between the degree of foaming of the expandable polymerized polystyrene particles and the quality of the product formed therefrom. In previous manufacturing processes, no particular attention has been paid to this detail. We determined that when the degree of foaming of the expandable polymerized polystyrene particles is from 60 to 400 cc./10 g. (measured in accordance with JIS–A–9511) a cellular polystyrene product of optimum quality will be obtained.

We discovered that when the degree of foaming was below 60 cc., the diameters of the cells in the end product were excessively small and were distributed unevenly by reason of poor expandable ability.

To the contrary, when the degree of foaming exceeded 400 cc., slippage took place in the extrusion process, with the result that there were unwanted variations in production, and the end product was replete with excessively large gas cells which were unevenly distributed therethrough.

TABLE 2.—SHAPE OF EXPANDABLE PARTICLES AND QUALITY OF OBJECTIVE MOLDED PRODUCT

| Experiment No | 5 | 6 | 7 |
|---|---|---|---|
| Material particles: | | | |
| Degree of foaming (cc./10 g.) | 350 | 350 | 90. |
| Mean particle dia. (mm.) | 0.6 | 0.6 | 0.42. |
| Presence or not of flaws | Present | None | None. |
| Shape | B | A | A. |
| Molded product: | | | |
| Specific gravity | 0.062 | 0.062 | 0.137. |
| Dia. of air cell: | | | |
| Max. (mm.) | 0.44 | 0.44 | 0.38. |
| Min. (mm.) | 0.12 | 0.14 | 0.10. |
| Mean (mm.) | 0.32 | 0.32 | 0.20. |
| Pinholes (ruptured parts): | | | |
| Number of pinholes (pc./m.$^2$) | 210 | 2 | 1. |
| Max. dia. (mm.) | 1.0 | 1.0 | 0.5. |
| Min. dia. (mm.) | 0.3 | 0.3 | |
| Gas cells: | | | |
| Condition of distribution | Good | Good | Good. |
| Wall thickness (visually observed) | Uniform | Uniform | Uniform. |
| Feel: | | | |
| Surface | Smooth | Smooth | Smooth. |
| Texture | Somewhat coarse | Fine and beautiful | Fine and beautiful |

A. Particles having approximately true roundness in their cross-section.
B. Particles with dented portions in their cross-section.

Our discovery in this connection was confirmed by experimentation, as exemplified by the results indicated in Table 3 herein below.

TABLE 3.—DEGREE OF FOAMING OF EXPANDABLE PARTICLES AND QUALITY OF OBJECTIVE MOLDED PRODUCT

| Experiment No | 3 | 4 |
|---|---|---|
| Material particles: | | |
| Degree of foaming (cc./10 g.) | 220 | 600. |
| Mean dia. of particles (mm.) | 0.6 | 0.8. |
| Presence or not of deformation and flaws | Present | Present. |
| Molded product: | | |
| Specific gravity | 0.070 | 0.068. |
| Dia. of cell: | | |
| Max. (mm.) | 0.44 | 0.65. |
| Min. (mm.) | 0.12 | 0.18. |
| Mean (mm.) | 0.32 | 0.45. |
| Pinholes (ruptured parts): | | |
| Number of pinholes (pc./m.$^2$) | 210 | 830. |
| Max. dia. (mm.) | 0.1 | 1.5. |
| Min. dia. (mm.) | 0.3 | 0.5. |
| Distribution | Pinholes of around 0.7 mm. occupy about 90% of the total. | Pinholes of around 1.2 mm. occupy about 60% of the total. |
| Air cells: | | |
| Condition of distribution | Uniform and good | Fairly uniform. |
| Thickness of cell wall | Uniform | Uneven. |
| Feel: | | |
| Surface | Smooth | With coarse feel. |
| Texture | Somewhat fine | Coarse. |
| Productivity | Uniform in the amount of extrusion. Productive efficiency is high. | Amount of extrusion undergoes variations and tends to be uneven. |

This use of a foaming agent having certain characteristics of expansion is vital to the production of an end product having optimum quality. We have discovered that foaming agents having the desired characteristics are those aliphatic hydrocarbons having 3 to 4 carbons. In the past, hydrocarbons having 2 to 6 carbons were principally used. Insofar as hydrocarbons having 5 or more carbons are concerned, the same are in liquid phase under conditions of normal temperature and normal pressure. During the formation of the end product from the expandable polymerized polystyrene particles, the same are heated, usually over 120° C., which application of heat causes these hydrocarbons having 5 or more carbons to assume a gaseous state. When the end product cools to normal temperature, such gas returns to its normal liquid phase, with the result that the internal pressure of the individual cells is diminished, resulting in a shrinking of such cells, which shrinking usually causes a deformation of the end product. Furthermore, the specific gravity of an end product in which the foaming agent is a hydrocarbon having 5 or more carbons will be exceedingly great.

Insofar as the use of hydrocarbons having less than 2 carbons is concerned, these are in gas phase under normal temperature and a normal pressure, equivalent to those hydrocarbons with 3 to 4 carbons, and there will thus be no shrinkage of the air cells in use of such hydrocarbons. However, since the inherent boiling of hydrocarbons having less than 2 carbons is excessively low, these exceedingly volatile elements will not be retained long in the expandable polymerized polystyrene particles. There will therefore occur rapid deterioration under conditions of storage when hydrocarbons having less than 2 carbons are utilized as the foaming agent.

It is to be understood that our invention is not limited solely to the use of aliphatic hydrocarbons having 3–4 carbons. We recognize that organic gases having a range of boiling points corresponding to those of hydrocarbons having 3–4 carbons may be used. For example monochlorodifluoromethane, dichlorodifluoromethane, and 1.1-difluoroethane. However, these organic gases are relatively high priced, and it would usually be uneconomical to utilize them as raw materials for industrial production.

Accordingly, we believe that aliphatic hydrocarbons having 3 to 4 carbons provide the optimum in foaming agents for expandable polymerized polystyrene particles. This is because such aliphatic hydrocarbons are in gas phase under normal temperature and normal pressure, they will not cause shrinking of the air cells when the end product cools, their specific gravity is low, and the price is moderate. Examples of the hydrocarbons having 3 to 4 carbons are propane, having 3 carbons and butane, having 4 carbons.

As is well known, it is necessary to provide, in the polymerization system, during formation of expandable polymerized polystyrene particles, some solvent which enables the particles to absorb and hold the expanding or foaming agent. According to conventional methods, toluene, ethylbenzene, tetrachlorethylene, ethyl acetate, and benzene, have been used for this purpose.

Reviewing, by experimentation, the results obtained through use of such conventional solvents, we determined that those with a boiling point of 100° C., or below, but above normal temperature, will become gaseous during the heating which is a prerequisite to formation of the finished product, and will thereby lose their function as solvents. This loss of function will result in an insufficient plasticizing of the base resin, or shrinking of the objective products formed, or causing of early expansion, or reduction in the degree of foaming and expansion.

It was determined, by experimentation, that those which had an instance of great solvency, or the ability to rapidly dissolve polystyrene, possessed the advantage of speeding impregnation of the foaming agent into the interior of the expandable polymerized polystyrene particles, and in speeding absorption of the expansion or foaming agents, but they also possessed certain disadvantages in that they would lower the softening temperature of the base material, cause irregular air cells, cause breakdown of gas cell walls, so that the large number of gas cells may intermix, and have a tendency to cause a shrinking of the end product upon cooling. As a result, such use of solvents having a high degree of dissolving ability with respect to polystyrene requires minute care, for if even a slight excess of such solvents is present, it will cause rupture, deformation and shrinking of air cells.

Furthermore, when certain solvents are used, such as tetrachloroethylene, and the same is added in the beginning or in the course of polymerization, the degree of polymerization of the produced polystyrene will be lowered, whereby the product will be rendered unsuitable as an expandable base material.

We have discovered that optimum results can be obtained when styrene is used as a solvent. In cases where styrene is used as a solvent, sufficient styrene is initially charged in the polymerization system to comprise the monomer for formation of the expandable polymerized polystyrene particles. A part of the charged styrene becomes residuals and the residual amount of styrene will be equivalent to the quantity of solvent which is normally introduced into the system in conventional manufacturing methods.

We have discovered that the use of styrene as a solvent provides optimum results in that it is adequate for polystyrene with respect to boiling point and dissolving (plasticizing) ability, and, through use of styrene as a solvent, the expanding or foaming agent is readily absorbed into the particles and is retained in a stable condition. Furthermore, the use of adequate amount of residual styrene as a solvent results in expandable polymerized polystyrene particles which do not stick to the screw or cause slipping at the time of the extrusion process, but facilitate the feed and mixing of the expandable polymerized polystyrene particles. In the formation of the finished product, styrene used as a solvent is effective in formation of air cells, does not break down the cell walls, eliminates the formation of coarse air cells, and does not cause shrinking or contracting of air cells. Moreover, the finished product is chemically stable in quality, and the cell wall is free from adverse effect of the residual solvent. The reason why the use of styrene as a solvent avoids this latter mentioned adverse effect of other residual solvents has not been precisely determined, but we believe that it is due to the fact that the greater part of the solvent styrene is converted into polymers by the heat applied in the course of the molding or extrusion process.

We further discovered that, when styrene is used as a solvent, it is necessary to utilize some form of carrier to make the styrene remain in the expandable polymerized polystyrene particles as as solvent, otherwise, all of the styrene in the polymerization system would be converted to polymers. We determined, through experimentation, that nitrite is an optimum carrier. Of course, the amount of nitrite utilized is in direct relationship to the quantity of styrene solvent which it is desired to retain in the expandable polymerized polystyrene particles. This was determined through experimentation as exemplified by the following tables 4 and 5.

TABLE 4.—EFFECT OF RETAINING MONOMER BY NITRITE

| Amount of sodium nitrite (Parts) | Inversing ratio to polymer (percent) | Amount of monomer retained in particles (percent) |
| --- | --- | --- |
| 0.040 | 87.3 | 12.5 |
| 0.030 | 88.4 | 11.1 |
| 0.010 | 93.8 | 5.3 |
| 0.005 | 96.4 | 2.9 |
| 0.001 | 99.1 | 0.5 |
| 0 | 100.0 | 0 |

NOTE.—The above is the result obtained by the shaking suspension-polymerization by charging styrene for 100 parts, benzoyl peroxide for 0.2 parts, polyvinyl alcohol for 0.2 part, propane for 5 parts and water 100 parts in test tubes respectively with changes in the amount of sodium nitrite jointly used.

TABLE 5.—EFFECT OF NITRITE TO RETAIN MONOMER AND ITS REPRODUCTIVITY

| Condition of polymerization | Inversing ratio to polymer (percent) | Amount of residual monomer in particles (percent) |
| --- | --- | --- |
| 82° C. x 30 Hrs. | 97.9 | 1.8 |
|  | 97.9 | 1.7 |
|  | 97.7 | 1.9 |
| 82° C. x 30 Hrs. plus 90° C. x 10 Hrs. plus 98° C. x 10 Hrs. | 97.8 | 1.8 |
|  | 97.8 | 1.7 |
|  | 97.6 | 1.8 |

NOTE.—Shaking suspension-polymerization was performed with test tube sealing 100 parts of styrene, 0.3 part of benzoyl peroxide, 0.2 part of polyvinyl alcohol, and 6 parts of butane, respectively, with changes in polymerization time and polymerization temperature. Then the contents of the tube were taken out, and the residual amount of styrene contained within the beads was worked out by the ultra-violet absorption spectrum method.

Another advantage which is gained through use of nitrite as a carrier is that nitrite is soluble in water, but is insoluble in the monomer. Therefore, by rinsing the expandable polymerized polystyrene particles in water, all of the nitrite may be readily removed, and will not remain as a harmful element. Furthermore the power of nitrite in inhibiting polymerization in water phase is excellent, so that it is very rare that the produced expandable polymerized polystyrene particles get stained or stick to one another. With respect to this point, the result of the use of nitrite is far better than the results obtained through use of inhibitive agents such as copper salt, rodanate, hydroquinone, etc.

In past practice, various kinds of inorganic substances, such as calcium carbonate, diatom earth, silica, etc. have been used as nucleus producing agents for expansion of the foaming agent in the extrusion-forming process of the expandable polymerized polystyrene particles. On examination of these previously used inorganic substances it was found that they were unsuitable from the viewpoints of both productivity and quality of the objective end product. It was discovered that the use of these previously used inorganic substances resulted in an inadequate diameter of the produced air cells, non-uniform distribution of the air cells, even thickness of the cell walls, excessive specific gravity, pinholes, and an undesirable texture of the product, having an unwanted appearance.

We have discovered that optimum results are obtained when calcined perlite is utilized as a nucleus producing agent. We further discovered that calcined perlite having an average particle diameter of less than $30\mu$, is most acceptable. Optimum results are obtained when the particle size of the calcined perlite is between 2 to $10\mu$. This finding was confirmed by experimentation, as exemplified by the results specified in Tables 6 and 7.

TABLE 6.—CLASSIFICATION OF NUCLEUS-PRODUCING AGENTS AND OBJECTIVE MOLDED PRODUCTS

| Classification of nucleus-producing agents | Molded foam products | | | |
| --- | --- | --- | --- | --- |
|  | Specific gravity | Dia. of air cells (mm.) | | |
|  |  | Max. | Min. | Mean |
| Calcined perlite (Average grain size $4.3\mu$) | 0.137 | 0.38 | 0.10 | 0.20 |
| Calcium carbonate (Average grain size $4.1\mu$) | 0.176 | 0.50 | 0.20 | 0.33 |
| Diatom earth (Average grain size $4.0\mu$) | 0.144 | 0.43 | 0.14 | 0.25 |
| Silica (Average grain size $3.0\mu$) | 0.232 | 0.48 | 0.18 | 0.33 |
| Silica (Average grain size $0.03\mu$) | 0.138 | 0.56 | 0.16 | 0.32 |

Distribution of air cells—Uniformity.
    Calcined perlite>diatom. earth>silica>
    calcium carbonate
Texture—Fineness of texture.
    Calcined perlite>silica, diatom. earth>
    calcium carbonate

TABLE 7.—PARTICLE SIZE OF CALCINED PERLITE AND OBJECTIVE MOLDED PRODUCT

| Average particle size ($\mu$) | Molded foam product | | | | |
| --- | --- | --- | --- | --- | --- |
|  | Specific gravity | Pinholes (pc./m.$^2$) | Dia. of air cells (mm.) | | |
|  |  |  | Max. | Min. | Mean |
| 4 | 0.090 | 2 | 0.35 | 0.15 | 0.25 |
| 50 | 0.083 | 174 | 0.48 | 0.19 | 0.25 |

In summation, combining all of the many facets of our invention, it will be noted that the same relates to the manufacture of polystyrene products having a specific gravity of 0.05 to 0.20 and containing numerous air cells having an average diameter less than 0.6 mm., and which is characterized in that aliphatic hydrocarbons with 3 to 4 carbons are used as the foaming agent, a part of the styrene within the system is utilized as the solvent for the produced polystyrene particles, nitrite from 0.0003 to 0.0500% of the weight of the total styrene to the polymerization system is utilized as the solvent retaining agent, the foaming agent is forced into the polymerization system at the moment when the rate of conversion of the styrene is 80 to 98% complete, the interior of the polymerization system is maintained under over-pressure, adjustment is made to the conditions of dispersion and agitation of the polymerization system so as to avoid any defective portions in the particle surface and to impart to the expandable polymerized polystyrene particles proximate true roundness, with average particle diameter of 0.40 to 1.00 mm., and then 100 parts (by weight) of expandable polymerized polystyrene particles are mixed with 0.5 to 10.0 parts (by weight) of calcined perlite with an average particle size of $30\mu$ or less.

Expandable polymerized polystyrene particles produced according to our invention may be heat molded by any conventional process.

A general description of the manufacturing process is as follows:

In order to obtain the base material of expandable polymerized polystyrene particles, styrene is used as the principal subjective material. Such styrene is put to suspension-polymerization in an aqueous medium, in the presence of a suitable ordinary catalyst. The suspension-polymerization method is preferably utilized in that (1) this method is most suitable as compared with other granulating methods for the objective of obtaining particles with the desired particle size of 0.40 to 1.00 mm., and particles of proximate true roundness; (2) this method enables uniform distribution of the foaming agent inside of the particles; and (3) this method is most reasonable in order to retain the solvent styrene inside each particle uniformly, and at high efficiency.

In order to yield expandable polymerized polystyrene particles of the desired size and shape, a proper dispersing agent must be added to the polymerization system. Those which we have found acceptable include polyvinyl pyrrolidone, polyvinyl alcohol, and calcium phosphate. It is obvious that others may be selected. Furthermore, agitating conditions in the polymerization system must be controlled. For example, the shape and r.p.m. of the agitator should be controlled so that there will arise no turbulence in liquid phase inside the system, thereby avoiding collisions between the produced particles and preventing flaws from being generated in the particle surface. This will be obvious to those skilled in this art.

In order to obtain the designated degree of foaming, namely, from 60 to 400 cc./10 g., using the foaming agents which we have specified as being preferred, foaming agent in the range of from 1.4 to 6.0% by weight of the expandable polymerized polystyrene should be retained by the expandable polymerized polystyrene particles. In order to retain this quantity of our specified, preferred foaming agents and the solvent which we have specified being as preferred, residual styrene in the quantity of from 0.8 to 2.0% by weight of the expandable polymerized polystyrene particles should be retained by the particles. In order for this residual solvent styrene to be retained in the expandable polymerized polystyrene particles, the presence of a carrier is required in the polymerization system. In the use of nitrite as a carrier, the presence of nitrite in the polymerization system is required in the amount of from 0.0003 to 0.0500% by weight of the total styrene in the system.

Insofar as addition of the nitrite to the system is concerned, this may be done at any moment before the rate of polymerization exceeds 98%. An early or late moment of addition of the nitrite will not have any substantial adverse effect on the velocity of polymerization so long as it is added before the rate of polymerization has exceeded 98%. The designated amount of nitrite may be added all at one time, or may be added, one part at a time, all during the polymerization process, up until the rate of polymerization reaches 98%.

The foaming agent to be added into the polymerization system may be either in liquid or gaseous form, and a mixture of one kind or more than two kinds may be used.

The interior of the polymerization system must be kept in a condition of over pressure. According to our experiments, pressures of from 7 to 20 kg./cm.$^2$ provide optimum results. In actual practice it must be determined what pressure should be used, within the range of stipulated pressures depending upon the classification of the foaming agent which is used, and the condition of polymerization. This is a well known and conventional practice in the art.

As to the moment of forcing the foaming agent into the system, we have found that the optimum time for addition of the foaming agent is when the rate of conversion of the monomer into the polymer has reached about 80 to 98% of completion. In the event that the conversion rate is below about 80%, the polymerization velocity will be reduced by addition of the foaming agent, accompanied by deformation of the produced particles, and adhesion of the particles, one to the other, or binding of the particles into coagulation. When the conversion rate exceeds about 98%, the effect of penetration of the foaming agent into the nuclei of the particles and the distribution within the particles is diminished, the particles taking a longer time to absorb the designated amount.

The expandable polymerized polystyrene particles may be treated with calcined perlite, as previously disclosed. In such treatment, care should be taken so that calcined perlite adheres almost uniformly all over the expandable polymerized polystyrene particles. Care in this respect must be taken, for if the calcined perlite adheres unevenly, it is liable to cause irregular distribution of air cells or irregular diameters in the air cells, and pinholes or uneven thickness of cell walls is likely to occur.

It is, of course, to be understood that the calcined perlite may be added to the system during the polymerization process, rather than separately treating the expandable polymerized polystyrene particles after the polymerization process has been completed, as is well known in the art.

We have determined that when the amount of calcined perlite exceeds 10 parts, the yield of the objective product decreases, the diameter of the air cells increases, and the specific gravity increases, with resultant poor texture and appearance of the finished product. When the amount of calcined perlite is below 0.5 part, the nucleus producing properties thereof are diminished, rendering the quality of the end product unsatisfactory.

The resultant mixture of expandable polymerized polystyrene particles and calcined perlite may be employed in producing any conventional air-cellular polystyrene product. For instance, the same may be subject to extrusion by use of an extrusion molding machine, under high temperature, whereby the objective molded product can be obtained.

Examples of our manufacturing process are as follows:

*Example 1*

100 parts of styrene monomer, 0.3 part of benzoyl peroxide (dissolved in the styrene), 0.007 part of sodium nitrite, and 0.3 part of polyvinyl-pyrrolidone (dispersing agent) were dissolved in 300 parts of water, and the mixture was charged into an autoclave provided with an agitator of turbine type impellers and baffle boards for light dispersion. The air remaining in the autoclave was displaced with nitrogen, and suspension-polymerization was advanced while agitating at 270 r.p.m. and raising the temperature to 90° C. After the lapse of 6 hours, and when the rate of polymerization had reached 90%, 6 parts of butane gas were forced into the system, so as to raise the pressure inside the system to approximately 11 kg./cm.$^2$, and then agitation was continued at 90° C. 2 hours later, the content was taken out after cooling down to normal temperature, with successive filtration, washing, and drying.

The obtained expandable polymerized polystyrene particles were 0.5 mm. in average diameter, and were of proximate true roundness. No dented portions or flaws were noted in the peripheral surface of the particles obtained. Additionally, the degree of foaming was noted to be 120 cc./10 g., and the resinous content was 0.270 in specific viscosity in 0.3% toluene solution.

To 100 parts of these expandable polymerized polystyrene particles was added 3 parts of calcined perlite having an average particle size of $4\mu$. After mixing by agitation in a ribbon-type blender for 15 minutes, extrusion was carried out into the atmosphere at 130° C. by the use of an extrusion molding machine. (Diameter of the screw—66 mm., diameter of the die—80 mm.)

The produced air-cellular polystyrene product had a uniform thickness of 0.4 mm., and a specific gravity of 0.10. The average diameter of the air cells was 0.2 mm. and their distribution was uniform, presenting substantially a deflected pentagonal dodecahedron. The cell walls were thin, but even in their thickness. The finished product had a surface which was smooth, with a luster, and no pinholes were observed. The physical properties of the same were found to be as follows:

Tensile strength (kg./mm.$^2$):
    Lengthwise _____ 0.35
    Breadthwise _____ 0.37
Tear strength (kg./mm.$^2$):
    Lengthwise _____ 0.33
Degree of deflection in cell wall thickness (percent):
    Breadthwise _____ 0.32
    Lengthwise _____ ±0.5
    Breadthwise _____ ±0.5
Conductivity of heat (Kcal./m.h.° C.) _____ 0.024
Degree of permeation of moisture (g./24 h.m.$^2$)__ 110
Resiliency (percent) _____ [1] 85

[1] Instantaneous.

*Example 2*

100 parts of styrene monomer, 0.255 part of benzoyl peroxide (dissolved in the styrene), 0.04 part of tertiary butyl perbenzoate, 170 parts of water, 0.0045 part sodium nitrite (dissolved in the water) and 0.125 part of polyvinylpyrrolidone were charged in an autoclave. While heavily agitating, air in the autoclave was displaced with nitrogen gas. Polymerization was then advanced at 85° C. by raising the temperature to 90° C. in 3 hours, at which time 0.0045 part of polyvinyl alcohol was added. At the moment when the rate of polymerization had reached approximately 90%, 9 parts of propane gas were forced into the autoclave, so that the pressure in the system would reach 15 kg./cm.$^2$. The polymerization was then continued further at 96° C. for another 5 hours. The obtained expandable polymerized polystyrene particles were filtered, rinsed, and dried.

The yielded expandable polymerized polystyrene particles were 0.55 mm. in average particle size, and were of proximate true roundness. The shape of the particles was good. The degree of foaming of the expandable polymerized polystyrene particles was 270 cc./10g.

The expandable polymerized polystyrene particles were treated with calcined perlite and the extrusion molding process was carried out as set forth in Example 1.

In the finished product obtained, the average particle size of the air cells was 0.32 mm., with a few pinholes, and the texture of the product was smooth.

*Example 3*

100 parts of styrene monomer, 0.255 part benzoyl peroxide (dissolved in the styrene), 0.04 part of tertiary butyl perbenzoate, 170 parts of water, 0.0045 part of sodium nitrite (dissolved in the water) and 0.125 part of polyvinylpyrrolidone were charged in an autoclave. While heavily agitating, the air of the autoclave was displaced with nitrogen gas. Then polymerization was advanced at 85° C. by raising the temperature to 90° C. in 3 hours, at which time 0.0045 part of polyvinyl alcohol was added. At the time when the rate of polymerization reached 85%, 5 parts of butane and 4 parts of propane were slowly added. The time spent for the addition of butane and propane was about 1 hour. Then polymerization was continued at 96° C. and 10 kg./cm.$^2$ for 5 hours so as to complete polymerization and impregnation. The obtained expandable polymerized polystyrene particles were filtered, rinsed, and dried.

The obtained expandable polymerized polystyrene particles were 0.6 mm. in means particle size, the degree of foaming was 200 cc./10 g., and the particles were of proximate true roundness.

The expandable polymerized polystyrene particles were treated with calcined perlite and the extrusion molding process was carried out as set forth in Example 1, whereby a finished product was obtained. Such finished product had air cells of an average mean diameter of 0.24 mm., with uniform distribution of air cells, having very few pinholes, and a smooth texture.

We have thus provided a manufacturing process for the production of expandable polymerized polystyrene particles which will produce a product of superior quality and which may be manufactured on an industrial scale. It is to be particularly noted that our process eliminates the need for any granulation processes, and in addition, eliminates the heretofore necessary practice of forcing a foaming agent into the polystyrene particles which is, of course, quite uneconomical. The expandable polymerized polystyrene particles of our invention are obtained in a single process from the monomer, on an economical basis, with the desired degree of foaming imparted.

Furthermore, the end product obtained through the use of our process has exemplary characteristics, such as:

(1) The yield product will not be readily damaged by bending. This is a characteristic deriving from the intrinsic nature of the calcined perlite and also from the uniform distribution of air cells having a relatively small diameter.

(2) The yield product is high in elongation under heating, hence it facilitates thermal molding processes.

(3) The yield product is uniform in size of its air cells and their distribution, and is free from shrinkage or contraction due to the drop in temperature at the time when it leaves the extrusion heat, whereby its dimensional stability is assured.

Various changes may be made in the form of the invention herein described without departing from the spirit of the invention or the scope of the following claims.

We claim:

1. The method of manufacturing expandable polymerized polystyrene particles which includes the polymerization in an aqueous suspension medium of a styrene monomer, adding a foaming agent to the polymerization system when the rate of conversion of the styrene monomer is about 80 to 98% of completion, the foaming agent being of the type having characteristics for expansion of polymerized polystyrene particles to from 60 to 400 cc./10 g., the foaming agent further comprising an aliphatic hydrocarbon having from 3 to 4 carbons, sufficient styrene being initially supplied to the system to provide the monomer for formation of expandable polymerized polystyrene particles and a residual quantity thereof equivalent to the quantity of solvent required for particle absorption and holding of the foaming agent, adding a nitrite carrier to the system when the rate of conversion of the styrene monomer is less than 98% complete, the quantity of nitrite carrier added being from 0.0003 to 0.0500% by weight of the total styrene in the system, and selectively introducing calcined perlite into the aqueous medium either during polymerization or after completion of polymerization.

2. The method of manufacturing expandable polymerized polystyrene particles which includes the polymerization in an aqueous suspension medium of a styrene monomer, adding a foaming agent to the polymerization system when the rate of conversion of the styrene monomer is about 80 to 98% of completion, the foaming agent comprising an aliphatic hydrocarbon having from 3 to 4 carbons, the aliphatic hydrocarbon added being of a quantity whereby foaming agent of from about 1.4% to 6.0% by weight of the expandable polymerized polystyrene particles is retained by the expandable polymerized polystyrene particles, sufficient styrene being initially supplied to the system to provide the monomer for formation of the expandable polymerized polystyrene particles and a residual quantity thereof equivalent to the quantity of solvent required for particle absorption and holding of the foaming agent, adding a nitrite carrier to the system when the rate of conversion of the styrene monomer is less than 98% complete, the quantity of nitrite carrier added being from 0.0003 to 0.0500% by weight of the total styrene in the system, and selectively introducing calcined perlite into the aqueous medium either during polymerization or after completion of polymerization.

3. The method of manufacturing expandable polymerized polystyrene particles which includes the polymerization in an aqueous suspension medium of a styrene monomer, adding a foaming agent to the polymerization system, when the rate of conversion of the styrene monomer is about 80 to 98% of completion, the foaming agent comprising an aliphatic hydrocarbon having from 3 to 4 carbons, sufficient styrene being initially supplied to the system to provide the monomer for formation of expandable polymerized polystyrene particles and a residual quantity thereof equivalent to the quantity of solvent required for particle absorption and holding of the foaming agent, the residual styrene over and above that required for the formation of the expandable polymerized polystyrene particles being of a quantity whereby styrene from 0.8 to 2.0% by weight of the expandable polymerized polystyrene particles is retained by the expandable polymerized polystyrene particles, adding a nitrite carrier to the system when the rate of conversion of the styrene monomer is less than 98% complete, the quantity of nitrite carrier added being from 0.0003 to 0.0500% by weight of the total styrene in the system, and selectively introducing calcined perlite into the aqueous medium either during polymerization or after completion of polymerization.

4. The method of manufacturing cellular polystyrene which includes the formation of expandable polymerized polystyrene particles, and treating the expandable polymerized polystyrene particles with 0.5 to 10.0 parts by weight of calcined perlite.

5. The method as specified in claim 4 wherein the calcined perlite is in the form of particles having an average particle size of less than 30μ.

6. The method as specified in claim 4 wherein the calcined perlite is in the form of particles having an average particle size of between 2 and 10μ.

7. The method of manufacturing cellular polystyrene which includes the polymerization in an aqueous suspension medium of a styrene monomer, adding a foaming agent to the polymerization system when the rate of conversion of the styrene monomer is about 80 to 98% of completion, the foaming agent is of the type having characteristics for expansion of polymerized polystyrene particles to from 60 to 400 cc./10 g., the foaming agent further comprising an aliphatic hydrocarbon having from 3 to 4 carbons, the aliphatic hydrocarbon added being of a quantity whereby foaming agent of from 1.4 to 6.0% by weight of the expandable polymerized polystyrene particles is retained by the expandable polymerized polystyrene particles, sufficient styrene being initially supplied to the system to provide the monomer for formation of expandable polymerized polystyrene particles and a residual quantity thereof equivalent to the quantity of solvent required for particle absorption and holding of the foaming agent, the residual styrene over and above that required for the formation of the expandable polymerized polystyrene particles being of a quantity whereby styrene of from 0.8 to 2% by weight of the expandable polymerized polystyrene particles is retained by the expandable polymerized polystyrene particles, adding a nitrite carrier to the system when the rate of conversion of the styrene monomer is less than 98% complete, the quantity of nitrite carrier added being from 0.0003 to 0.0500% by weight of the total styrene in the system, and treating the expandable polymerized polystyrene particles thus formed with 0.5 to 10.0 parts by weight of calcined perlite, the calcined perlite being in particle form having an average particle size of less than 30μ.

8. The method of manufacturing expandable polymerized polystyrene particles which includes the polymerization in an aqueous suspension medium of a styrene monomer, adding a foaming agent to the polymerization system when the rate of conversion of the styrene monomer is about 80 to 98% of completion, the foaming agent being of the type having characteristics for expansion of polymerized polystyrene particles to from 60 to 400 cc./10 g., the foaming agent further comprising an organic gas having a boiling point corresponding to the boiling point of an aliphatic hydrocarbon having from 3 to 4 carbons, sufficient styrene being initially supplied to the system to provide the monomer for formation of expandable polymerized polystyrene particles and a residual quantity thereof equivalent to the quantity of solvent required for particle absorption and holding of the foaming agent, adding a nitrite carrier to the system when the rate of conversion of the styrene monomer is less than 98% complete, the quantity of nitrite carrier added being from 0.0003 to 0.0500% by weight of the total styrene in the system, and selectively introducing calcined perlite into the aqueous medium either during polymerization or after completion of polymerization.

9. The method as specified in claim 8 wherein the organic gas is monochlorodifluoromethane.

10. The method as specified in claim 8 wherein the organic gas is dichlorodifluoromethane.

11. The method as specified in claim 8 wherein the organic gas is 1.1 difluoromethane.

12. The method of manufacturing expandable polymerized polystyrene particles which includes the polymerization in an aqueous suspension medium of a styrene monomer, adding a foaming agent to the polymerization system when the rate of conversion of the styrene monomer is about 80 to 98% of completion, the foaming agent being of the type having characteristics for expansion of polymerized polystyrene particles to from 60 to 400 cc./10 g., sufficient styrene being initially supplied to the system to provide the monomer for formation of expandable polymerized polystyrene particles and a residual quantity thereof equivalent to the quantity of solvent required for particle absorption and holding of the foaming agent, adding a nitrite carrier to the system when the rate of conversion of the styrene monomer is less than 98% complete, the quantity of nitrite carrier added being from 0.0003 to 0.0500% by weight of the total styrene in the system, and selectively introducing calcined perlite into the aqueous medium either during polymerization or after completion of polymerization.

References Cited by the Examiner

UNITED STATES PATENTS 3,192,169  6/1965  Doak _____ 260—2.5

MURRAY TILLMAN, *Primary Examiner.*

M. FOELAK, *Assistant Examiner.*